United States Patent [19]

Michishita et al.

[11] Patent Number: 4,471,199
[45] Date of Patent: Sep. 11, 1984

[54] EDM OF A ROLL USING SEGMENTED ELECTRODE SHORT-CIRCUITED IN THE ROUGH MACHINE STEP

[75] Inventors: Katsumi Michishita; Mitsugi Kawano, both of Fukuyama; Fujio Aoshima, Nagoya; Yukio Kato, Kani; Tetsuhiro Asamoto, Nagoya, all of Japan

[73] Assignees: Mitsubishi Denki Kabushiki Kaisha; Nippon Kokan Kabushiki Kaisha, both of Tokyo, Japan

[21] Appl. No.: 424,314

[22] Filed: Sep. 27, 1982

[30] Foreign Application Priority Data

Sep. 30, 1981 [JP] Japan .................. 56-156002

[51] Int. Cl.³ ............................. B23P 1/20
[52] U.S. Cl. .................. 219/69 M; 219/69 E; 219/69 C
[58] Field of Search ............ 219/69 R, 69 E, 69 M, 219/69 V, 69 P

[56] References Cited

U.S. PATENT DOCUMENTS

| | | | |
|---|---|---|---|
| 3,067,317 | 12/1962 | Buro | 219/69 V |
| 3,832,510 | 8/1974 | Pfau et al. | 219/69 P |
| 4,219,718 | 8/1980 | Sato et al. | 219/69 |
| 4,221,952 | 9/1980 | Sato et al. | 219/69 |
| 4,230,927 | 10/1980 | Sato et al. | 219/69 |
| 4,233,485 | 11/1980 | Sato et al. | 219/69 |
| 4,242,557 | 12/1980 | Sato et al. | 219/69 |
| 4,247,748 | 1/1981 | Sato et al. | 219/69 |
| 4,287,403 | 9/1981 | Sato et al. | 219/69 |

FOREIGN PATENT DOCUMENTS

| | | | |
|---|---|---|---|
| 72296 | 6/1978 | Japan | 219/69 E |
| 0048527 | 4/1980 | Japan | 219/69 E |
| 856340 | 12/1960 | United Kingdom | 219/69 E |

Primary Examiner—Roy N. Envall, Jr.
Assistant Examiner—Geoffrey S. Evans
Attorney, Agent, or Firm—Fleit, Jacobson, Cohn and Price

[57] ABSTRACT

There is disclosed a method for electrical discharge machining of a workpiece in the form of a roll by application of an electrical voltage across said workpiece and an electrode or electrodes mounted opposite to each other with a predetermined gap therebetween, and more particularly such method wherein each such electrode is formed by plural electrode segments separated from one another by insulators, and the electrical discharge operation is performed with said electrode segments in each electrode short-circuited to one another in the rough machining step and with said electrode segments insulated from one another in the finish machining step for reducing the working time.

8 Claims, 5 Drawing Figures

PRIOR ART

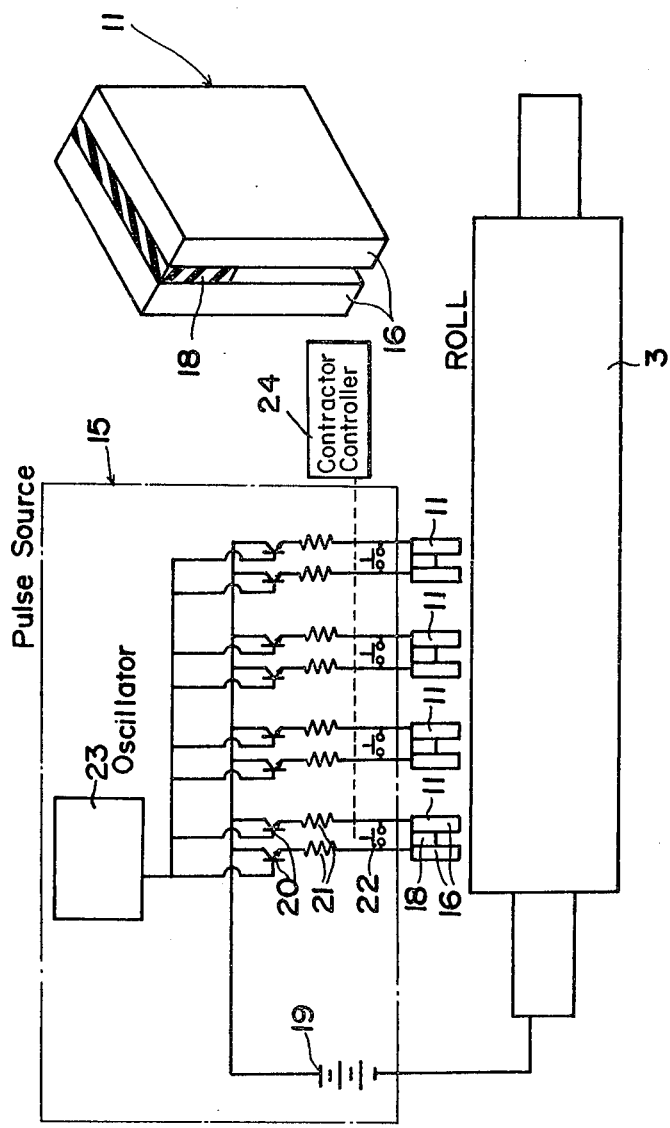

EDM OF A ROLL USING SEGMENTED ELECTRODE SHORT-CIRCUITED IN THE ROUGH MACHINE STEP

BACKGROUND OF THE INVENTION

This invention relates to a method for electrical discharge machining wherein the workpiece surface is etched by electrical discharge machining to a predetermined surface roughness for providing the satinized indented surface on the workpiece. Hereafter, such machining method and the work in the form of a roll will be abbreviated occasionally to electrical discharge dull machining and the work, respectively.

Heretofore, in providing a satin finish to a roll used for rolling a steel skelp, especially to a cold working roll, hard metal particles known as shots or grits are projected to a ground roll surface for providing indented marks on the roll surface. In recent years, this type of machining is tentatively performed by an electrical discharge machining. The electrical discharge machining as used in such method consists essentially in providing an insulating liquid such as kerosene in the narrow discharge gap between the electrode and the work surface and a pulsed voltage is applied periodically across the electrode and the work to cause an electrical discharge for etching or machining the work surface thereby. Such discharge is caused to occur repeatedly on the roll surface while the roll is rotated about its axis and moved longitudinally along the rotary axis of the roll for providing a satin finish on the roll surface consisting of spirally extending continuous discharge marks. This is the method for providing a uniform satin finish on the roll surface by utilizing an electrical discharge machining. The satinized roll surface thus obtained has many advantages over that obtained through projection of metal particles in that the indents are more accentuated and trim in shape, while not being influenced by the degree of hardness or the manufacture process of the roll, and in that the metal structure at or near the roll surface may be improved in toughness due to electrical discharge and thus may be most convenient for a roll used in the roll working.

According to the conventional practice for such electrical discharge dull machining operation, multihead and multi-divided electrodes are used with a view to reducing the working time. In this case, on account of certain characteristics of the electrical discharge machining operation, the working time is increased markedly in the region of lower surface roughness of 6 to 10 μRZ as compared to the conventional machining methods using metallic particles such as shots.

SUMMARY OF THE INVENTION

In view of the foregoing, this invention has it as a principal object to provide a method for electrical discharge machining of the roll according to which the working time for the machining in the low surface roughness range may be reduced.

Briefly, the present invention resides in a method for electrical discharge machining of a workpiece in the form of a roll by application of an electrical voltage across said workpiece and an electrode or electrodes mounted opposite to each other with a predetermined gap therebetween, wherein each said electrode is formed by plural electrode segments separated from one another by insulators and wherein the electrical discharge operation is performed with said electrode segments of each electrode short-circuited to one another in the rough machining step of the workpiece and with said electrode segments insulated from one another in the finish machining step.

According to the present invention, since electrical discharge machining operation is performed in the rough machining step with the plural electrode segments short-circuited relative to one another, the electrical discharge is apt to be stable and distributed uniformly resulting in the elevated machining speed and more uniformly satinized workpiece surface.

Furthermore, according to the present invention, since the roll surface is etched by the time of finish machining step by the preceding machining operation, and thus electrical discharge is apt to take place at a small discharge energy, the finish machining step is performed with the plural electrode segments insulated from one another. Hence, the number of the electrodes may be increased effectively in the region of lower surface roughness with resultant reduction in the working or machining time. Since the finish machining time represents a major portion of the working time especially in multistage working, such reduction in the finish machining time is reflected in considerable reduction in the overall working time.

Other and further objects, features and advantages of the invention will be more fully apparent from the following description.

BRIEF DESCRIPTION OF THE DRAWINGS

FIG. 4 is a perspective view showing an electrode used in executing the method according to an embodiment of the invention.

FIG. 5 is a diagrammatic view showing an apparatus used in executing the above method.

DESCRIPTION OF A PREFERRED EMBODIMENT

Figure 1:
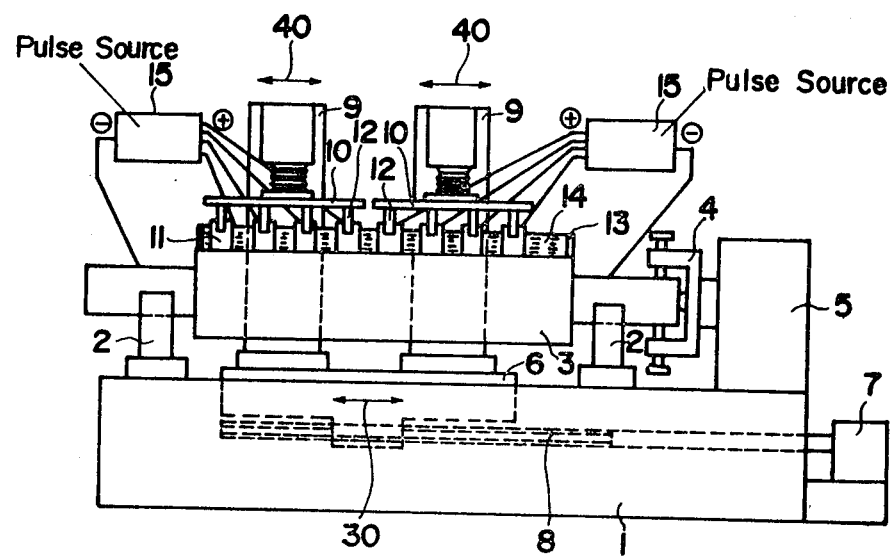
FIG. 1 is an overall side elevation showing an example of an electrical discharge dull machining device.

As shown in FIG. 1, a pair of bearings 2, 2 are secured to a bed 1 of an electric dull discharge machining device. A workpiece or roll 3 is mounted horizontally by these bearings 2, 2. One end of the roll 3 is chucked by a dog 4 which is rotated by a roll driving unit 5 mounted on the bed 1. The roll 3 is rotated by rotation of the dog 4. A base block 6 is mounted on the bed 1 and slidably movable on the bed 1 by operation of a longitudinal feed unit 7 and a lead screw 8 in the longitudinal direction as shown by arrow mark 30 in FIG. 2.

A pair of head columns 9 are secured on the base block 9 and similarly movable longitudinally with movement of the base blocks 6 as shown by the arrow mark 40. An electrode holder 10 is mounted to each head column 9 and mounts in turn a plurality of electrodes 11 at a substantially equal mounting pitch by means of an insulating plate 12. The electrodes 11 are substantially of the same shape and mounted in opposition to the roll 3 at a predetermined gap or interval.

Figure 2:
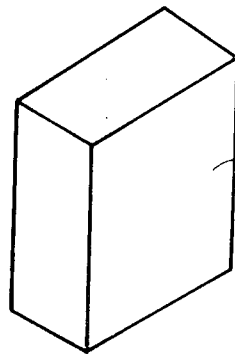
FIGS. 2 and 3 are perspective views showing two examples of the prior-art electrodes.
Figure 3:
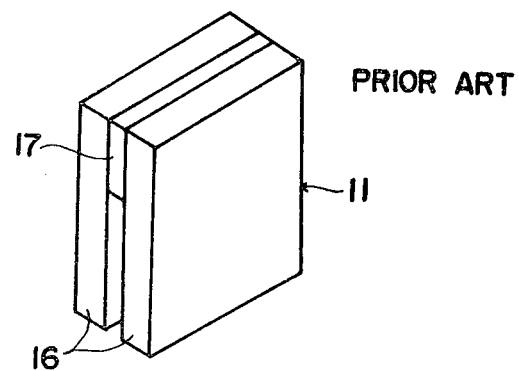

A liquid tank 13 is held above the roll 3 and supplied with a working liquid 14 by means of a pump, not shown. The working liquid 14 which has overflown the tank 13 is filtered and returned to the tank 13, although such recycling means is not shown in the drawing. A pulse source 15 is connected to supply a pulsed voltage across the electrodes 11 and the roll 3 for forming an electric discharge. Each electrode 11 may be fed by the corresponding main spindle towards and away from the surface of the roll 3 independently at each head column 9. When the ground roll surface is subjected to electric dull machining, an electrical discharge is likely to occur only at a spot because the roll itself tends to reject such electrical discharge and the base surface is a ground flat surface. Thus it has been found that an electrode shown in FIG. 3 formed of plural sections or segments connected together by an electrically conducting plate 17 is more convenient for electrical discharge machining than the single block type electrode shown in FIG. 1, because the electrical discharge is then more stable and distributed, the working speed is higher, and the resulting satin finish is more uniform. Thus the satin surface worked by the single block type electrode shown in FIG. 2 is not uniform and therefore unfit for rolls used in roll working, and the electrode structure shown in FIG. 3 is more useful as mentioned above. In case of working to a low surface roughness of the order of 6 to 10 $\mu$RZ, general practice is to work in steps of rough working, intermediate working and finish working for reducing the working time so that the desired surface roughness may be attained at the final step. It has been found that, in the final step, since the discharge machined or etched surface is already formed on the base surface and hence the electrical discharge may then occur more easily and at a lower discharge energy, it is not always necessary to use the electrode as shown in FIG. 3 and the single block type electrode is sufficient to effect stable machining. In such multistage operation, the finish working time represents a major portion of the working time.

According to the method of the present invention, an electrode 11 is formed by plural small sections or segments 16 connected together by insulating plates 18. In the rough machining, the segments of the electrodes are short-circuited to each other. In the finish working operation, the segments 16 of the electrode remain isolated and connected individually to the feeder lines for effectively increasing the number of electrodes and thereby reducing the working time. In the method of the present invention, a feeder line is connected to each electrode segment 16 in the finish machining and more than two or more times of the discharge energy can be applied per each electrode, with the multiple number being equal to the number of the segments 16 included in each electrode 11. In this manner, the machining time can be reduced to less than one half depending on said multiple number. Since the working step is the finish machining, the discharge energy to be consumed in each electrode segment is small and the capacity of the source 15 need not be changed despite the fact that the feeder line is connected to each segment 16. Thus it is possible to markedly reduce the working time for machining to a low surface roughness without the necessity of changing the source capacity.

As shown in FIG. 5, the pulse source 15 is formed by a d.c. source 19, switching transistors 20, current limiting resistors 21, contactors 22 opened or closed according to prevailing machining conditions, and an oscillator 23 for on/off operation the switching transistors 20. Each electrode segment 16 is connected by way of the corresponding current limiting resistor 21 and the corresponding switching element or transistor 20 to the d.c. source 19 which is the machining pulse source. The switching transistors 20 may be turned on and off by the oscillator 23 to supply pulsed voltage across the roll 3 and the corresponding electrode segments 16.

In rough machining, the contactor 22 is closed automatically in the power source 15 for short-circuiting the electrode segments 16 in each electrode 11. In this case, the two feeders are connected together to a single electrode composed of short-circuited electrode segments. Subsequently, in finish machining, the contactor 22 is opened, so that the electrode segments 16 are insulated from each other and connected separately to the feeder lines. Thus, in finish machining, the number of electrodes is doubled. In the example shown in FIG. 5, the number of electrodes has been increased effectively from four to eight and the machining time can be reduced to approximately one half that required in the conventional practice. As mentioned above, the contactors 22 are automatically closed during the rough machining step. Closing of the contactors 22 can be accomplished by a conventional contactor controller 24 as depicted in FIG. 5. Typically, a machine operator effects switching of the controller 24 by transmitting a signal thereto from a typical power control panel. Alternatively, control of the contactors 22, through the contactor controller 24, can be done automatically by conventional monitoring of the workpiece or by timed cycles of rough and finish machining steps.

The term rough machining used in the specification means any machining phase excluding the finish machining phase and the finish machining means the machining phase in which the surface is to be worked ultimately to the desired surface roughness.

It is to be noted that only one pulse source 15 has been shown in FIG. 5 for simplicity of the drawing, although there should be two such sources in relation to the construction shown in FIG. 1.

While the foregoing description has been made of the case wherein the electrode 11 is composed of two electrode segments, this is not limitative and one electrode may thus be composed of a larger number of the electrode segments.

What is claimed is:

1. A method for electrical discharge machining of a workpiece in the form of a roll by application of an electrical voltage across said workpiece and an electrode or electrodes mounted opposite to each other with a predetermined gap therebetween, characterized in that each such electrode is formed by plural electrode segments separated from one another by insulators, in that electrical discharge machining is performed in a rough machining step of the workpiece with said electrode segments of each electrode short-circuited to one another and in that electrical discharge machining is performed in a finish machining step with said electrode segments insulated from one another.

2. The method as claimed in claim 1 characterized in that multi-divided electrodes are used, with each of said multi-divided electrode consisting of plural electrode segments separated from one another by insulators.

3. The method as claimed in claim 2 characterized in that said plural electrode segments are connected to one another by switching means that may be turned on and off depending on prevailing machining conditions.

4. The method as claimed in claim 3 characterized in that contactors are used as said switching means.

5. The method as claimed in claim 3 characterized in that said plural electrode segments are connected separately to a machining power source through current limiting resistors and switching elements.

6. The method as claimed in claim 5 characterized in that said switching elements are turned on and off under the control of an oscillator for supplying a pulsed voltage across the electrode segments and the work in the form of a roll.

7. The method as claimed in claim 1 characterized in that the ultimate desired surface roughness is obtained in the finish machining step.

8. The method as claimed in claim 7 characterized in that rough machining step represents any machining step other then said finish machining step.

* * * * *